COMPOUNDS DERIVED FROM PHENANTHRENEQUINONE

Herbert K. Reimschuessel and Franklin Boardman, Morristown, N.J., assignors to Allied Chemical Corporation, New York, N.Y., a corporation of New York
No Drawing. Filed Jan. 14, 1966, Ser. No. 520,676
3 Claims. (Cl. 260—266)

ABSTRACT OF THE DISCLOSURE

The compounds of the invention are 9,11,20,22-tetrazatetrabenzo[a,c,l,n]pentacene and 9,11,13,22,24,26-hexazatetrabenzo[a,c,p,r]heptacene which are useful as pigments in organic coating compositions. Such compounds are prepared by condensing 9,10-phenanthrenequinone with the appropriate tetraamine compound.

---

This invention relates to novel heterocyclic compounds derived from 9,10-phenanthrenequinone and the preparation thereof. More particularly, this invention relates to the reaction product of 9,10-phenanthrenequinone and certain tetraamine compounds.

The novel compounds of the present invention are

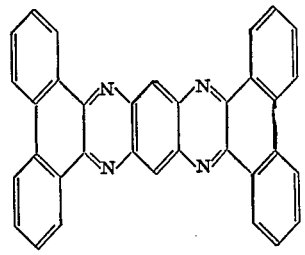

9,11,20,22-tetrazatetrabenzo[a,c,l,n]pentacene and

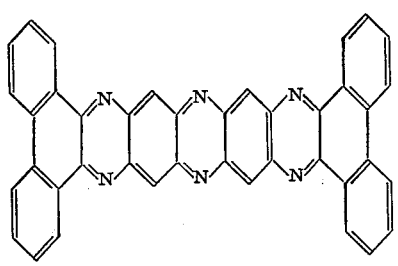

9,11,13,22,24,26 - hexazatetrabenzo[a,c,p,r]heptacene. These compounds are highly colored materials which are insoluble in common organic solvents such as xylene. The materials can be dispersed or suspended in organic coating compositions to serve as pigments.

The compounds of this invention are prepared by reacting 9,10-phenanthrenequinone with 1,2,4,5-tetraaminobenzene or 2,3,7,8-tetraaminophenazine in accordance with the following equations:

(I)

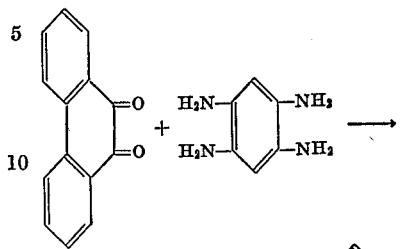

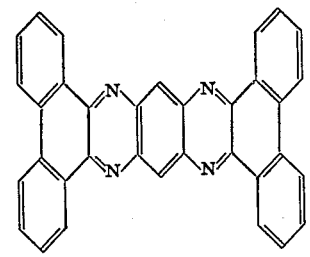

(II)

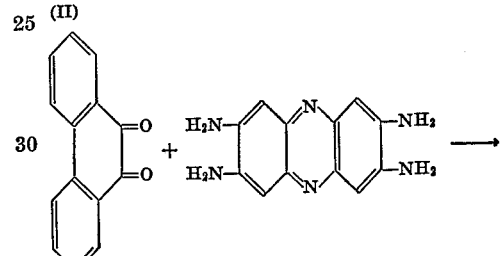

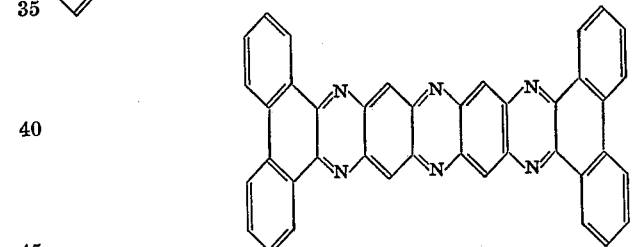

The reaction is preferably conducted in a liquid medium which is a solvent for both reactants but a non-solvent for the product. When such a solvent medium is employed, the product is obtained as a precipitate which can be separated by filtration or other conventional means. Particularly good results have been obtained using a mixture of pyridine and dimethylformamide as the solvent medium. Other suitable solvent media include pyridine, dimethylformamide, ethyl alcohol, glacial acetic acid, etc.

Advantageously the reaction is conducted in the presence of an acid catalyst. Such acidic catalysts can be provided by the addition of a mineral acid or salt thereof to the reaction medium. Alternatively, the tetraamine reactant can be employed in the form of an acid salt; for instance, outstanding results have been obtained using 1,2,4,5-tetraaminobenzene tetrahydrochloride or 2,3,7,8-tetraaminophenazine tetrahydrochloride as one of the reactants.

The temperature at which the reaction is conducted can range from 100° to 153° C. Advantageously the reaction is carried out at reflux temperature. It is preferable to maintain the reaction medium under an inert atmosphere such as nitrogen during at least the initial period of reaction.

The following examples are given to further illustrate the invention and to describe the best mode contemplated by us of carrying it out, but it is to be understood that the invention is not to be limited in any way by the details described therein.

Example 1

25 milliliters of freshly distilled pyridine and 25 ml. of distilled dimethylformamide were charged to a 100-ml. round-bottom flask fitted with gas inlet and outlet tubes and a condenser. Nitrogen was bubbled through the mixture for 30 minutes and 0.005 mol 1,2,4,5-tetraaminobenzene tetrahydrochloride and 0.01 mol phenanthrenequinone were added. The temperature was raised to reflux (about 115° C.) and maintained for 12 hours. Nitrogen was passed through the system during the first four hours of reaction. After about 2 hours, a brick-red precipitate formed. The mixture was cooled to room temperature and the precipitate was filtered, suspended in pyridine at 100° C. for 5 hours, cooled and dried at 160° C. and 0.1 mm. Hg pressure for 16 hours.

2.0 grams of 9,11,20,22-tetrazatetrabenzo[a,c,l,n]pentacene (84% yield) were recovered. The product had a brick-red color and did not melt below 360° C. It was insoluble in xylene and soluble in sulfuric acid. The results of elemental analysis follow. Theoretical: C, 84.7%; H, 3.7%; N, 11.6%. Found: C, 83.8%; H, 3.5%; N, 12.7%.

Example 2

25 milliliters of distilled pyridine and 25 ml. distilled dimethylformamide were charged to a flask as in Example 1 and nitrogen bubbled through for 30 minutes. 0.005 mol tetraaminophenanzine tetrahydrochloride and 0.01 mol phenanthrenequinone were added and the mixture heated at reflux temperature for 12 hours. A nitrogen atmosphere was maintained during the first six hours of reaction. A precipitate formed and was recovered by filtration. The product was suspended in pyridine at 100° C. for five hours, cooled, filtered, and dried at 60° C. and 0.1 mm. Hg pressure for 16 hours. Two grams of 9,11,13,22,24,26 - hexazetrabenzo[a,c,p,r]heptacene were obtained representing a 69% yield. The product had a dark purple color and was insoluble in xylene.

It will be apparent that many modifications and variations may be effected without departing from the scope of the novel concepts of the present invention, and the illustrative details disclosed are not to be construed as imposing undue limitations on the invention.

We claim:

1. A compound selected from the group consisting of 9,11,20,22-tetrazatetrabenzo[a,c,l,n]pentacene and 9,11,13,22,24,26-hexazatetrabenzo[a,c,p,r]heptacene.

2. 9,11,20,22-tetrazatetrabenzo[a,c,l,n]pentacene.

3. 9,11,13,22,24,26 - hexazatetrabenzo[a,c,p,r]heptacene.

References Cited

Kato et al.: Chem. Abstracts, vol. 51, column 16484 (1951).

NICHOLAS S. RIZZO, Primary Examiner.

A. M. TIGHE, Assistant Examiner.